United States Patent
Shinohara et al.

(10) Patent No.: US 11,219,921 B2
(45) Date of Patent: Jan. 11, 2022

(54) METHOD FOR MANUFACTURING COATED OBJECT AND COATING SUBSTANCE SPREADING APPARATUS

(71) Applicant: ORIGIN COMPANY, LIMITED, Saitama (JP)

(72) Inventors: Shinichi Shinohara, Saitama (JP); Tatsuo Okubo, Saitama (JP); Takayuki Suzuki, Saitama (JP); Miya Yamazaki, Saitama (JP); Naoto Ozawa, Saitama (JP)

(73) Assignee: ORIGIN COMPANY, LIMITED, Saitama (JP)

(*) Notice: Subject to any disclaimer, the term of this patent is extended or adjusted under 35 U.S.C. 154(b) by 0 days.

(21) Appl. No.: 16/961,678

(22) PCT Filed: Nov. 21, 2018

(86) PCT No.: PCT/JP2018/042966
§ 371 (c)(1),
(2) Date: Jul. 11, 2020

(87) PCT Pub. No.: WO2019/142486
PCT Pub. Date: Jul. 25, 2019

(65) Prior Publication Data
US 2020/0384498 A1   Dec. 10, 2020

(30) Foreign Application Priority Data
Jan. 16, 2018  (JP) .............................. JP2018-005203

(51) Int. Cl.
*B05D 1/40*   (2006.01)
*B05C 11/08*  (2006.01)
*B05D 1/00*   (2006.01)

(52) U.S. Cl.
CPC ................ *B05D 1/40* (2013.01); *B05C 11/08* (2013.01); *B05D 1/005* (2013.01)

(58) Field of Classification Search
CPC ............ B05D 1/40; B05D 1/005; B05C 11/08
(Continued)

(56) References Cited

U.S. PATENT DOCUMENTS 4,586,292 A * 5/1986 Carroll .................... B24B 11/00
                                                   366/219
5,514,214 A * 5/1996 Joel ........................ B05D 1/005
                                                    118/52
(Continued)

FOREIGN PATENT DOCUMENTS

JP   S53-113846 A   10/1978
JP   S54-117545 A    9/1979
(Continued)

OTHER PUBLICATIONS

International Search Report (ISR) for International Application No. PCT/JP2018/042966, dated Feb. 19, 2019, 5 pages total [3 pgs. Original and 2 pgs. Translation].

*Primary Examiner* — Kelly M Gambetta
(74) *Attorney, Agent, or Firm* — Squire Patton Boggs (US) LLP

(57) ABSTRACT

A method for manufacturing a coated object and a coating substance spreading apparatus, which coat, as uniformly as possible, a coating substance on a curved coating target surface are provided. A method for manufacturing a coated object, the coated object being an object coated with a coating substance on a coating target surface Tf of the object T, the coating target surface Tf having a curved surface, includes dispensing the coating substance onto the coating target surface Tf; and revolving the object T, having the coating substance dispensed onto the coating target surface Tf, about a revolution axis 13a located remotely from the object T. A coating substance spreading apparatus 1 includes a revolution section 10 configured to revolve an object T about a revolution axis 13a located remotely from the object T. With these, a coating-substance-moving force that acts on each portion of the coating target surface Tf can be made close to an intensity proportional to a distance from the (Continued)

revolution axis 13a, and it is possible to suppress thickness differences or variation of the coating substance coated on the coating target surface Tf.

7 Claims, 8 Drawing Sheets

(58) Field of Classification Search
USPC .............................................. 427/240; 118/52
See application file for complete search history.

(56) References Cited

U.S. PATENT DOCUMENTS

| | | | |
|---|---|---|---|
| 8,889,222 B1* | 11/2014 | Ryabova | B05D 3/12 |
| | | | 427/240 |
| 2002/0041929 A1* | 4/2002 | Magne | B05B 13/0228 |
| | | | 427/240 |
| 2004/0047994 A1* | 3/2004 | Becker | C23C 26/00 |
| | | | 427/346 |
| 2005/0031782 A1* | 2/2005 | Foster | C23C 24/06 |
| | | | 427/240 |

FOREIGN PATENT DOCUMENTS

| | | |
|---|---|---|
| JP | 2002-042649 A | 2/2002 |
| JP | 2007-167776 A | 7/2007 |
| JP | 2009-015923 A | 1/2009 |
| WO | WO 2012/124253 A1 | 9/2012 |

* cited by examiner

METHOD FOR MANUFACTURING COATED OBJECT AND COATING SUBSTANCE SPREADING APPARATUS

CROSS-REFERENCE TO RELATED APPLICATIONS

This application is a National Stage filing under 35 U.S.C. § 371 of International Patent Application No. PCT/JP2018/042966, filed Nov. 21, 2018, which claims the benefit of priority to JP Application No. 2018-005203, filed Jan. 16, 2018 (registered as JP Patent No. 6643767 on Jan. 9, 2020), both applications which are incorporated herein by reference in their entirety for all purposes.

TECHNICAL FIELD

The present invention relates to a method for manufacturing coated object and a coating substance spreading apparatus, and specifically, to a method for manufacturing coated object and a coating substance spreading apparatus which can coat, as uniformly as possible, a coating substance on a curved coating target surface.

BACKGROUND ART

As a technique for forming a resin film with a uniform thickness on a substrate such as an optical disc, there is a spin-coating method. The spin-coating method forms a resin film by supplying a resin liquid as a raw material for a resin film to a center of a surface of a substrate and then rotating the substrate about an axis of rotation being vertical to the surface of the substrate and passing through the center of the surface of the substrate to spread the resin liquid over the entire surface (see Patent Document 1, for example).

RELATED ART DOCUMENT

Patent Document

Patent Document 1: JP 2009-15923 A

SUMMARY OF THE INVENTION

Problem to be Solved by the Invention

With the aforementioned spin-coating method, it is possible to form a resin film of a generally uniform thickness if the surface to be coated with the resin is flat. However, if the surface to be coated with the resin is a non-flat, curved surface, such as a spherical surface, it is difficult to form a resin film of a uniform thickness.

In view of the aforementioned problem, it is an object of the present invention to provide a method for manufacturing a coated object and a coating substance spreading apparatus, which can coat, as uniformly as possible, a coating substance on a curved coating target surface.

Means for Solving the Problem

To achieve the above object, a method for manufacturing a coated object according to the first aspect of the present invention is, as illustrated with reference to FIGS. 1 and 3 for example, a method for manufacturing a coated object, the coated object being an object coated with a coating substance R (see FIG. 2, for example) on a coating target surface Tf of the object T, and the coating target surface Tf having a curved surface, the method comprising: a dispensing step (S2) of dispensing the coating substance R onto the coating target surface Tf; and a revolution step (S8) of revolving the object T, having the coating substance R dispensed onto the coating target surface Tf, about a revolution axis 13a located remotely from the object T.

With such a configuration, a coating-substance-moving force that acts on each portion of the coating target surface can be made close to an intensity proportional to a distance from the revolution axis, and thus, it is possible to suppress thickness differences or variation of the coating substance coated on the coating target surface.

As for the method for manufacturing a coated object according to the second aspect of the present invention, as shown in FIGS. 2 and 3, for example, in the method for manufacturing a coated object according to the first aspect, in the dispensing step (S2), the coating substance R may contact part of the coating target surface Tf; and the method may further include a preliminary spread step (S3) of increasing, before the revolution step (S8), and by rotating the object T, a range over which the coating substance R contacts the coating target surface Tf.

With such a configuration, even where the range over which the coating substance contacts the coating target surface in the revolution step is difficult to enlarge because the coating target surface has the curved surface, it is possible to enlarge the range over which the coating substance contacts the coating target surface, by performing the preliminary spread step.

As for the method for manufacturing a coated object according to the third aspect of the present invention, as shown in FIGS. 2 and 3, for example, in the method for manufacturing a coated object according to the second aspect, the preliminary spread step (S3) may include a removal step (or, an excess portion separating off step) (S4) of removing (separating off) from the coating target surface Tf, a portion of the coating substance R dispensed onto the coating target surface Tf in the dispensing step (S2), the portion of the coating substance R being an amount exceeding a predetermined amount; and the method may further include a collection step (S5) of collecting, before the revolution step (S8), the coating substance R that has been removed from the object T in the removal step (S4).

With such a configuration, it is possible to suppress production of an excessive coating substance in the revolution step by removing the excess of the coating substance from the coating target surface before the revolution step, and to collect the thus-removed coating substance for effective reuse.

As for the method for manufacturing a coated object according to the fourth aspect of the present invention, as shown in FIGS. 1 and 3, for example, in the method for manufacturing a coated object according to any one of the first to third aspects, the method may include a rotation step (S7) of rotating the object T, having the coating substance R dispensed onto the coating target surface Tf, about a rotation axis 23a passing through the object T.

With such a configuration, it is possible to correct intensity differences, in a peripheral direction of the coating target surface about the rotation axis, of a coating-substance-moving force that acts on each portion of the coating target surface in the revolution step, and as a result, it is possible to achieve thickness uniformity of the coating substance coated on the coating target surface.

As for the method for manufacturing a coated object according to the fifth aspect of the present invention, as shown in FIGS. 1 and 3, for example, in the method for manufacturing a coated object according to the fourth aspect, a ratio of a force acting on the coating substance R (see FIG. 2, for example) on the coating target surface Tf to move the coating substance R in the rotation step (S8), to a maximum force acting on the coating substance R on the coating target surface Tf to move the coating substance R in the revolution step (S7), may be 0.5 or less.

With such a configuration, it is possible to avoid action of the revolution step from being disturbed by the rotation step.

As for the method for manufacturing a coated object according to the sixth aspect of the present invention, as shown in FIG. 3, for example, in the method for manufacturing a coated object according to the fourth or fifth aspect, a rotation speed in the rotation step (S7) may be lower than a revolution speed in the revolution step (S8).

With such a configuration, it is possible to correct relatively small thickness variation of the coating substance occurring in the revolution step, by performing the rotation at the rotation speed lower than the revolution speed of the revolution.

As for the method for manufacturing a coated object according to the seventh aspect of the present invention, as shown in FIGS. 1 and 3, for example, in the method for manufacturing a coated object according to any one of the fourth to sixth aspects, an angle α formed between the revolution axis 13a and the rotation axis 23a at a position at which the revolution axis 13a and the rotation axis 23a intersect each other may be from 15 degrees to 165 degrees.

With such a configuration, it is possible to substantially uniformize the thickness of the coating substance coated on the coating target surface.

As for the method for manufacturing a coated object according to the eighth aspect of the present invention, as shown in FIG. 1, for example, in the method for manufacturing a coated object according to any one of the first to seventh aspects, in a case in which the coating target surface Tf is formed as a spherical or substantially spherical surface, a ratio of a shortest distance L between the revolution axis 13a and the coating target surface Tf in a direction perpendicular to the revolution axis 13a, to a curvature radius Tfr (see FIG. 2, for example) of the coating target surface Tf, may be from 0.3 to 5, where the substantially spherical surface may be a surface of a near-spherical shape, such as an elliptical, paraboloidal or hyperboloidal surface, and the curvature radius in this case may be typically a curvature radius of a regression surface derived by the least-square method With such a configuration, it is possible to substantially uniformize the thickness of the coating substance coated on the coating target surface without excessively increasing a shortest distance between the revolution axis and the coating target surface in a direction perpendicular to the revolution axis.

As for the method for manufacturing a coated object according to the ninth aspect of the present invention, as shown in FIG. 1, for example, in the method for manufacturing a coated object according to the eighth aspect, the ratio of the shortest distance L between the revolution axis 13a and the coating target surface Tf in the direction perpendicular to the revolution axis 13a to the curvature radius Tfr (see FIG. 2, for example) of the coating target surface Tf may be 3 or higher.

With such a configuration, it is possible to substantially uniformize the thickness of the coating substance coated on the coating target surface even where the rotation step is not performed.

To achieve the above object, a coating substance spreading apparatus according to the tenth aspect of the present invention includes, as illustrated with reference to FIG. 1, for example, a revolution section 10 configured to revolve an object T about a revolution axis 13a located remotely from the object T, the object T having a coating target surface Tf formed thereon, the coating target surface Tf having a curved surface.

With such a configuration, it is possible to suppress thickness variation of the coating substance coated on the coating target surface.

As for the coating substance spreading apparatus according to the eleventh aspect of the present invention, as shown in FIG. 1, for example, in the coating substance spreading apparatus according to the tenth aspect, the apparatus may include a rotation section 20 configured to rotate the object T about a rotation axis 23a passing through the object T; and a rotation speed adjustment section 60 configured to adjust a rotation speed of the rotation section 20; wherein the rotation speed adjustment section 60 is configured as a control device to cause the revolution step (S8; see FIG. 3, for example) of the method for manufacturing a coated object according to any one of fourth to seventh aspects to be performed by the revolution section 10 and to cause the rotation step (S7; see FIG. 3, for example) of the method to be performed by the rotation section 20.

With such a configuration, it is possible to automatically suppress thickness variation of the coating substance coated on the coating target surface.

Effect of the Invention

According to the present invention, a coating-substance-moving force that acts on each portion of the coating target surface can be made close to an intensity proportional to a distance from the revolution axis, and thus, it is possible to suppress thickness differences or variation of the coating substance coated on the coating target surface.

Figure 1:
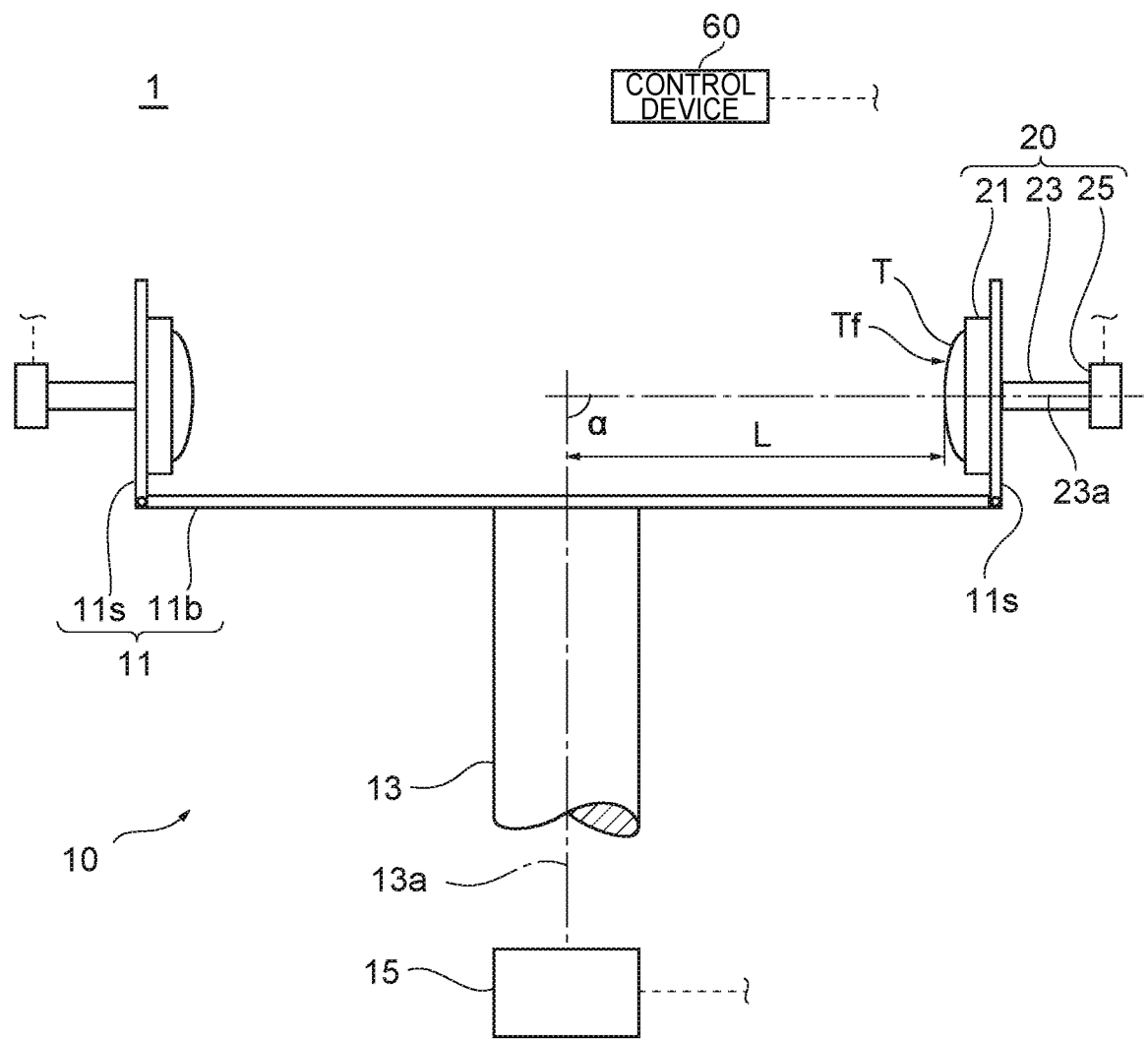
FIG. 1 is a front view showing a general configuration of a coating substance spreading apparatus according to an embodiment of the present invention.

10B is a fragmentary front view showing a crank section and components around the crank section of the coating substance spreading apparatus according to a second modification of another embodiment of the present invention.

DESCRIPTION OF EMBODIMENTS

This application is based on the Patent Application No. 2018-005203 filed on Jan. 16, 2018 in Japan, the contents of which are hereby incorporated in its entirety by reference into the present application, as part thereof.

The present invention will become more fully understood from the detailed description given hereinbelow. Further range of application of the present invention will become clearer from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the changes and modifications, those which may not literally fall within the scope of the patent claims constitute, therefore, a part of the present invention in the sense of doctrine of equivalents.

Description will hereinafter be made of an embodiment of the present invention with reference to the drawings. The same or corresponding members are denoted with the same reference numerals in all the drawings, and their descriptions are not repeated.

First, referring to FIG. 1, a description will be given of a coating substance spreading apparatus 1 (hereinafter referred to simply as "spreading apparatus 1") according to an embodiment of the present invention. FIG. 1 is a front view showing a general configuration of the spreading apparatus 1. The spreading apparatus 1 is an apparatus suited for coating a coating substance on a coating surface Tf of an object T to be coated while suppressing thickness variation of the coating substance in a case where the coating surface Tf of the object T has a curved surface, and the spreading apparatus 1 includes a revolution section 10, a rotation section 20, and a control device 60. Prior to a detailed description of the spreading apparatus 1, the object T to be coated with the coating substance in this embodiment will be described.

Figure 2:
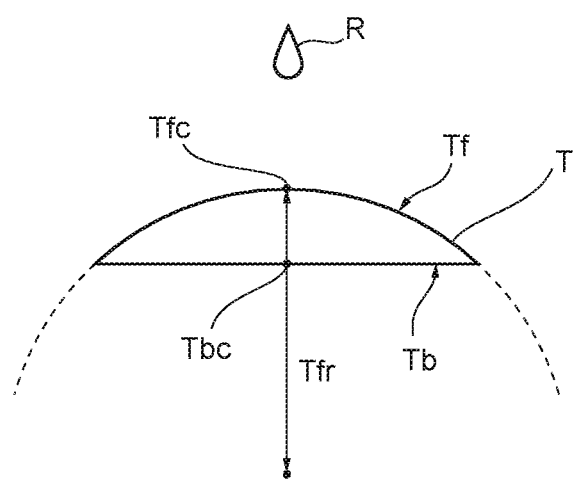
FIG. 2 is a vertical sectional view of an object to be applied in the embodiment of the present invention.

FIG. 2 is a vertical sectional view of the object T. In this embodiment, the object T has a shape obtained by cutting a sphere along a plane normal to the radius Tfr thereof. A spherical surface portion of the object T having such a shape is the coating surface Tf, and a surface of the object T that is on the reverse side of the coating surface Tf is a bottom surface Tb. The coating surface Tf corresponds to a coating target surface. In other words, the coating surface Tf is formed as a spherical surface having a curvature radius Tfr. The bottom surface Tb is a flat circular surface. The center of the bottom surface Tb will hereinafter be referred to as "bottom surface center Tbc." Further, a point at which an imaginary straight line that passes through the bottom surface center Tbc and is normal to the bottom surface Tb intersects the coating surface Tf will hereinafter be referred to as "coating surface center Tfc." The object T in this embodiment has a shape of a rotating body having, as its axis, an imaginary straight line that passes through the bottom surface center Tbc and the coating surface center Tfc. The coating surface Tf corresponds to a rotating surface of the rotating body. The coating substance R to be coated on the coating surface Tf is a liquid substance that has predetermined viscosity and can be used in applications such as a hard coating agent, an anti-reflective film, and the like. The predetermined viscosity depends on an intended use of the coating substance R and, typically, is such viscosity that the coating substance R is deformed to spread when a centrifugal force acts on the substance R. In the following description, FIG. 2 will be referenced as necessary when a configuration of the object T is being referred to.

Now, again, referring to FIG. 1, the description of the configuration of the spreading apparatus 1 will continue. The revolution section 10 includes a revolution plate 11, a revolution shaft 13, and a revolution mechanism 15. The revolution plate 11 includes a single revolution bottom plate 11b and a plurality of revolution side plates 11s. The revolution bottom plate 11b in this embodiment is formed of a plate-shaped member and disposed in such a manner that opposite surfaces of the plate-shaped member face upward and downward in a vertical direction, or plumb direction. Each of the revolution side plates 11s is formed of a plate-shaped member of such a size as to cover the bottom surface Tb of the object T; in this embodiment, each of the revolution side plates 11s is formed in a little larger size than the bottom surface Tb. In this embodiment, two of such revolution side plates 11s are provided, and each of the revolution side plates 11s is mounted to an edge of the revolution bottom plate 11b in such an orientation that opposite surfaces of the plate-shaped member lie perpendicularly to the surface of the revolution bottom plate 11b. The revolution side plates 11s are each mounted to extend upward from the revolution bottom plate 11b.

The revolution shaft 13 is a shaft that causes the revolution plate 11 to revolve within a plane of the revolution bottom plate 11b, and the shaft 13 is formed of an elongated, bar-shaped member. The revolution shaft 13 may be in the form of a solid bar from a viewpoint of increasing rigidity of the shaft 13 or may be in the form of a hollow bar from a viewpoint of reducing the weight of the shaft 13. In the case where the revolution shaft 13 is in the form of a hollow bar, a vacuum path for absorbing the object T and various wiring paths may be provided within the revolution shaft 13. Although a cross-sectional shape of the revolution shaft 13 as viewed perpendicularly across the axis of the shaft 13 (hereinafter referred to as "revolution axis 13a") is typically circular, the cross-sectional shape of the shaft 13 may be other than circular, such as elliptical or polygonal (for example, triangular, rectangular, pentagonal, hexagonal, or the like). The revolution shaft 13 is mounted to the revolution bottom plate 11b to extend, perpendicularly to the surface of the revolution bottom plate 11b, in a direction opposite to the direction where the revolution side plates 11s extends. In this embodiment, the revolution shaft 13 extends in a vertical, up-down, direction. The revolution mechanism 15 is mounted to one end of the revolution shaft 13, the other end opposite to the one end of the revolution shaft 13 being mounted to the revolution bottom plate 11b. The revolution mechanism 15 is mounted to the one end of the revolution shaft 13 in such a manner that the axis thereof coincides with the revolution axis 13a. A motor, a crank, or the like that can revolve the revolution plate 11 can be used as the revolution mechanism 15. The revolution section 10 configured in the described manner is configured to enable the revolution plate 11 to revolve within the plane of the revolution bottom plate 11b, by actuating the revolution mechanism 15 to revolve the revolution shaft 13 about the revolution axis 13a.

The rotation section 20 includes a rotation plate 21, a rotation shaft 23, and a rotation mechanism 25. In this embodiment, the rotation plate 21 is formed of a plate-shaped member having a little larger size than the bottom surface Tb of the object T, and is mounted to each of the revolution side plates 11s. The rotation plate 21 is disposed on the inner surface of the revolution side plate 11s in such a manner that an imaginary straight line normal to the surface of the rotation plate 21 lies in a horizontal direction. The rotation shaft 23 is a shaft that causes the rotation plate 21 to rotate within the plane of the plate 21 and is formed of an elongated bar-shaped member. Similarly to the aforementioned revolution shaft 13, the rotation shaft 23 may be in the form of a solid bar from a viewpoint of increasing rigidity of the shaft 23 or may be in the form of a hollow bar from a viewpoint of reducing the weight of the shaft 23. Further, although a cross-sectional shape of the rotation shaft 23 is typically circular as viewed in a direction perpendicular to the axis of the shaft 23 (hereinafter referred to as "rotation axis 23a") similarly to the described revolution axis 13a, the cross-sectional shape may be other than circular. The rotation shaft 23 extends horizontally through the revolution side plate 11s and is mounted, at one end of the rotation shaft 23, to the rotation plate 21. In this embodiment, the rotation axis 23a extends horizontally, and perpendicularly to the revolution axis 13a. The rotation shaft 23 is rotatably supported, via bearings, at a portion passing through the revolution side plate 11s. The other end opposite to the one end of the rotation shaft 23, at the one end the rotation plate 21 being mounted to the shaft 23, is located outside the revolution side plate 11s. The rotation mechanism 25 is mounted to the other end of the rotation shaft 23 in such a manner that the axis of the mechanism 25 coincides with the rotation axis 23a. A motor, a crank, or the like that can rotate the rotation plate 21 can be used as the rotation mechanism 25. The rotation section 20 configured in the described manner is configured to enable the rotation plate 21 to rotate within the plane of the plate 21, by actuating the rotation mechanism 25 to cause he rotation shaft 23 to rotate about the rotation axis 23a.

The control device 60 controls operation of the spreading apparatus 1 and also functions as a rotation speed adjustment unit. The control device 60 is electrically connected with the revolution mechanism 15 in a wired or wireless manner, and the control device 60 is configured to be capable of controlling, by transmitting control signals, start and stop of the revolution mechanism 15 and a revolution speed (angular speed) of the revolution mechanism 15 via an inverter (not shown). Further, the control device 60 is electrically connected with each of the rotation mechanisms 25 in a wired or wireless manner, and the control device 60 is configured to be capable of controlling, by transmitting control signals, start and stop of the rotation mechanism 25 and a rotation speed (angular speed) of the rotation mechanism 25 via an inverter (not shown).

Figure 3:
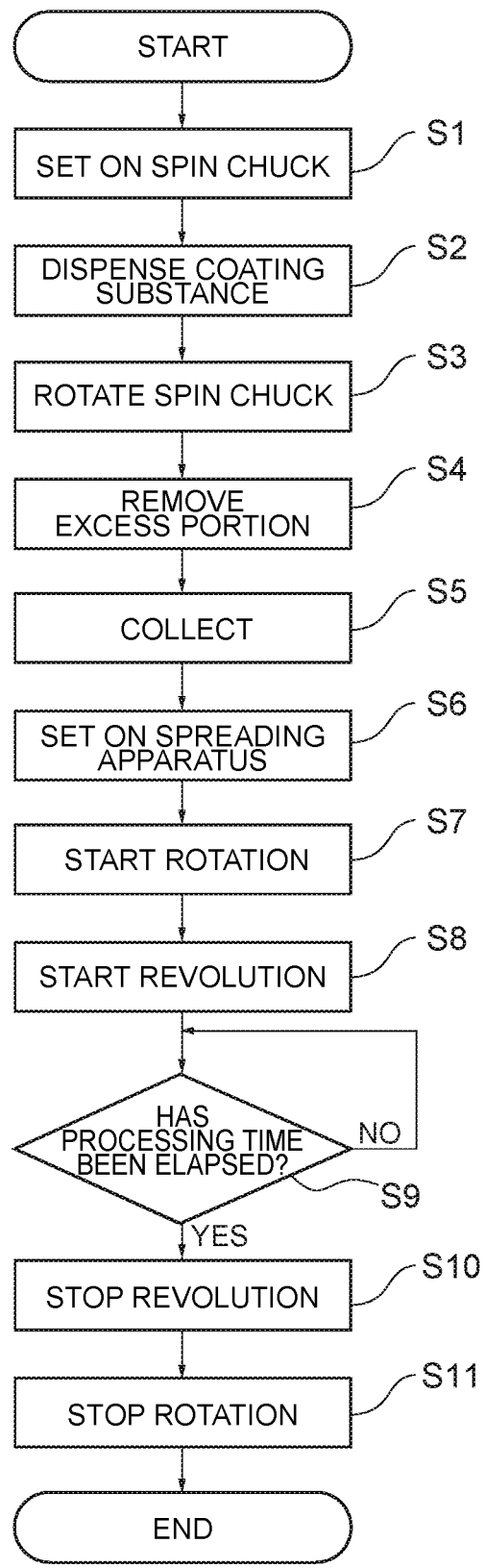
FIG. 3 is a flow chart showing a process for manufacturing a coated object.

Next, referring to FIG. 3, a description will be given of a method for manufacturing an object T coated with the coating substance R (hereinafter referred to as "coated object TR") according to an embodiment of the present invention. FIG. 3 is a flow chart showing a process for manufacturing a coated object TR. Although the following paragraphs describe the process for manufacturing a coated object TR by use of the above-described spreading apparatus 1 (see FIG. 1), such a coated object TR may be manufactured using an apparatus other than the spreading apparatus 1. The following description of the process for manufacturing a coated object TR by use of the spreading apparatus 1 is intended to serve also as a description of the operation of the spreading apparatus 1. In the following description, FIGS. 1 and 2 will be referenced as necessary when the configurations of the spreading apparatus 1 and the object T are being referred to.

Figure 4:
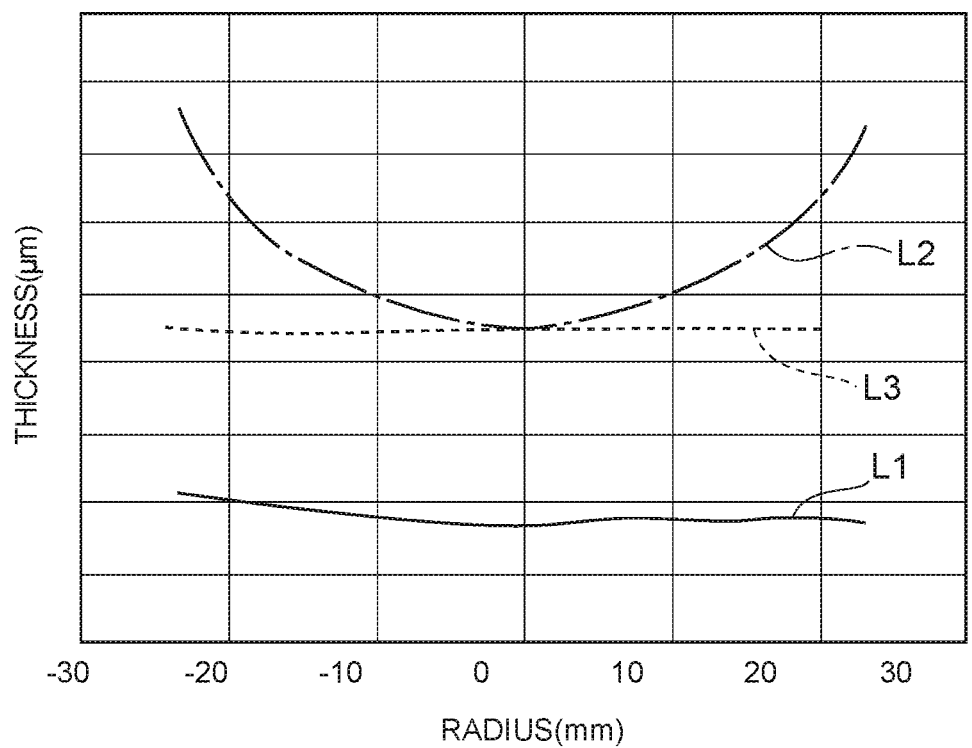
FIG. 4 is a graph showing a relationship between a distance from a coating surface center and a thickness of the coating substance.

At the start of manufacturing the coated object T, in this embodiment, prior to setting the object T on the spreading apparatus 1, the object T is set on a spin chuck (not shown) (S1). Conventional device commonly used for spin coating can be used as the spin chuck. The object T is set on the spin chuck with the coating surface Tf facing upward. After the object T is set on the spin chuck, the coating substance R is dispensed onto the coating surface Tf (dispensing step S2). Typically, the coating substance R is dispensed by being dripped onto the coating surface center Tfc. The spreading apparatus 1 may include a dispensing nozzle (not shown) for dispensing the coating substance R to the coating surface Tf. Once the coating substance R is dispensed onto the coating surface center Tfc, the spin chuck is rotated (S3). Thus, the coating substance R spreads from the coating surface center Tfc toward the outer periphery of the coating surface Tf (preliminary spread step). At this time, it is preferable that the coating substance R be spread in such a manner that the coating substance R contacts the entire coating surface Tf (namely in such a manner that all of the coating surface Tf is wetted with the coating substance R). It is also preferable that the coating substance R dispensed onto the coating surface Tf does not at least drip even if the spin chuck is inclined until the bottom surface Tb takes a vertical posture. In this embodiment, the rotation of the spin chuck is continued until the coating substance R reaches the outer periphery of the coating surface Tf and in such a manner that a portion of the coating substance R exceeding a predetermined amount is removed from the coating surface Tf (eventually from the object T) (removal step S4). The removal step (S4) is part of the preliminary spread step. Here, the predetermined amount is typically an amount calculated by adding an allowance amount to an amount corresponding to a thickness of the coating substance R that has become an intended coated object TR. The allowance amount may be determined as appropriate depending on manufacturing conditions. The portion of the coating substance R removed from the coating surface Tf is collected (collection step S5) and may be used for dispensing the coating substance R in the dispensing step (S2) for another object T. Thus, in this embodiment, when the coating substance R is spread with the conventional spin chuck as noted above, as the coating surface Tf is formed as a spherical surface, intensity of a force moving the coating substance R on the coating surface Tf, produced by the rotation of the spin chuck, is not proportional to a distance from the rotation axis as would be in a case where the coating is applied to a flat surface. Specifically, in this embodiment, the intensity of the aforementioned coating-substance-moving force changes in an upwardly convex parabolic curve where the intensity first increases as the distance from the rotation axis increases but decreases after reaching a maximum value halfway, so that the thickness of the coating substance R increases in a direction from the coating surface center Tfc toward the outer periphery as depicted by a dash-dot-dash line L2 in FIG. 4. Thus, it is difficult to form a film of the coating substance R having a uniform thickness over the entire coating surface Tf as depicted by a broken line L3 in FIG. 4 that would appear if the coating surface Tf is a flat surface (note that a point of a 0 mm radius in FIG. 4 corresponds to the coating surface center Tfc). Thus, this embodiment is designed to achieve a uniform thickness of the coating substance R on the coating surface Tf by continued use of the spreading apparatus 1.

After completion of the preliminary spread of the coating substance R on the coating surface Tf, the object T which is provided with the coating substance R is taken out from the stopped spin chuck and is then set on the spreading apparatus 1 (S6). At this time, the object T is set in such a manner that the bottom surface Tb of the object T contacts the inner surface of the corresponding revolution side plate 11s and, typically, in such a manner that the rotation axis 23a passes through the bottom surface center Tbc and the coating surface center Tfc. Thus, in this embodiment, up to two objects T are set on the spreading apparatus 1 in such a manner that the coating surface Tf of each of the objects T faces the revolution axis 13a and the object T is rotatable about the axis 23a passing through the bottom surface center Tbc and the coating surface center Tfc. In this embodiment, when the object T is set in place on the spreading apparatus 1, a horizontal distance between the revolution axis 13a and the coating surface center Tfc (hereinafter referred to as "revolution radius L") is approximately 0.7 times the curvature radius Tfr of the coating surface Tf. In other words, the revolution radius L is the shortest distance between the revolution axis 13a and the coating surface Tf in a direction perpendicular to the revolution axis 13a.

Figure 5A:
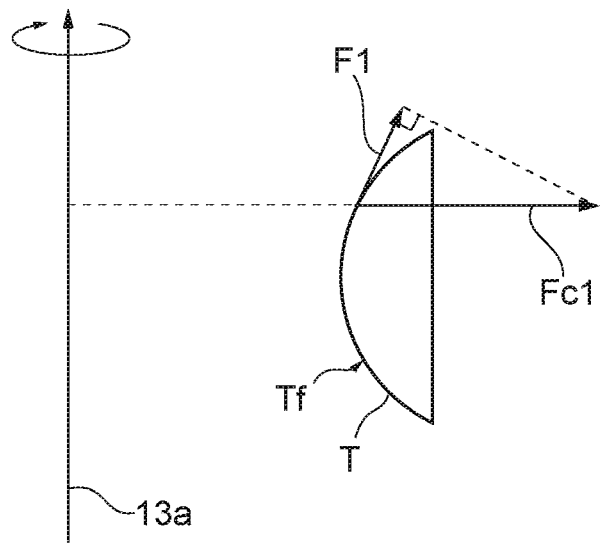
FIG. 5A is a diagram showing forces acting on the coating substance on the coating surface in a revolution section and FIG. 5B is a diagram showing the forces in a rotation section.

After the object T is set on the spreading apparatus 1, the rotation mechanism 25 is activated to rotate the rotation section 20 about the rotation axis 23a (S7). A purpose of rotating the rotation section 20 will be described later. Once the rotation of the rotation section 20 is started (S7), the revolution mechanism 15 is activated to revolve the revolution section 10 about the revolution axis 13a (S8). Thus, as shown in FIG. 5A, a force F1 moving the coating substance R in response to the revolution of the revolution section 10 (hereinafter referred to as "revolution moving force F1") acts on the coating substance R on the coating surface Tf, so that intensity of the revolution moving force F at each portion of the coating surface Tf can be almost proportional to a distance from the revolution axis 13a (namely a distance in the direction perpendicular to the revolution axis 13a). As a result, the thickness of the coating substance R on the coating surface Tf can be substantially uniformized. Note that the revolution moving force F1 is a component force, in a tangential direction of the coating surface Tf, of a centrifugal force Fc1 caused by the revolution of the revolution section 10, so the revolution moving force F1 is correlated to the centrifugal force Fc1. The centrifugal force Fc1 is proportional to a product of, at a portion of the coating surface Tf under consideration, a mass of the coating substance R, a distance from the revolution axis 13a to that portion in the direction perpendicular to the revolution axis 13a, and a square of an angular speed of the revolution section 10. Further, the thickness of the coating substance R on the coating surface Tf is related to the revolution moving force F1 acting on the coating substance R and to a time (processing time) over which the revolution section 10 is revolved, in other words, the thickness of the coating substance R is related to the mass of the coating substance R, the revolution distance L, the revolution speed (angular speed) of the revolution section 10, and the processing time. In view of the above, the revolution speed of the revolution section 10 may be determined with physical property of the coating substance R, the processing time, and the like taken into account. For example, in a case where a lens with the bottom surface Tb having a radius of 25 mm is chosen as the object T, the revolution speed of the revolution section 10 may be 500 rpm or more from a viewpoint of appropriately moving the coating substance R on the coating surface Tf but 5,000 rpm or less from a viewpoint of avoiding the coating substance R from being excessively removed (separated off) from the coating surface Tf Further, the revolution speed of the revolution section 10 may be increased if a required processing time is short and may be decreased if the required processing time is long; as an example, the revolution speed of the revolution section 10 may be within a range of about 2,000 to 3,000 rpm if the required processing time is within a range of 30 to 60 seconds, or may be about 1,000 rpm if the required processing time is within a range of 300 to 900 seconds. The revolution speed of the revolution section 10 may be changed halfway. For example, in order to suppress variation in the thickness of the coating substance R between an inner portion and an outer periphery of the coating surface Tf in the case where the coating surface Tf is a curved surface that is not uniform in shape between the inner portion and the outer periphery, the revolution section 10 may be first revolved at a relatively high speed so as to spread the coating substance R of the inner portion of the coating surface Tf, and once the coating substance R approaches the outer periphery of the coating surface Tf, the revolution section 10 may be revolved at a relatively low speed from a viewpoint of preventing the coating substance R from being spread thinly. In this embodiment, the revolution section 10 is revolved in a continuous manner. In the case where the coating substance R on the coating surface Tf is spread and a portion of the coating substance R is removed (separated off) from the coating surface Tf as the revolution section 10 is revolved, the removed portion (separated-off portion) of the coating substance R may be collected in the same way by the collection step (S5) so that the collected portion can be used for dispensing the coating substance R in the dispensing step (S2) for another object T. As for the thickness of the coating substance R spreading over the coating surface Tf, revolution of the revolution section 10 in the aforementioned manner can reduce thickness variation of the coating substance R in a radius direction between the coating surface center Tfc and a portion near the outer periphery of the coating surface Tf, as compared to a case where the conventional spin coating (for example, spin coating in the preliminary spread step) is performed. However, variation may sometimes occur in the thickness of the coating substance R in a peripheral direction of the coating surface Tf. It is deemed that a cause of such thickness variation occurring in the peripheral direction is that the intensity of the revolution moving force F1 differs due to different distances of individual portions from the revolution axis 13.

Figure 5B:
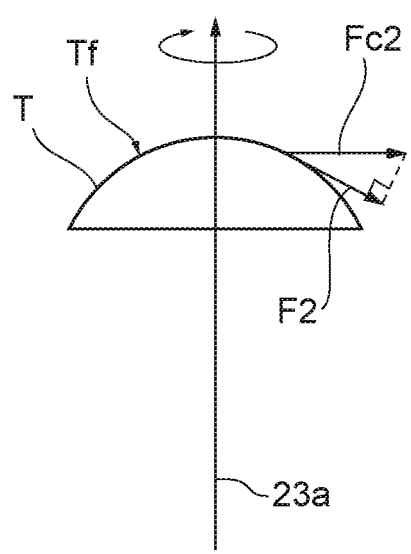

Therefore, in this embodiment, the rotation of the described rotation section 20 about the rotation axis 23a (S7)

is effected in addition to the revolution of the revolution section 10 (S8). By the rotation of the rotation section 20 about the rotation axis 23a, a force F2 moving the coating substance R in response to the rotation of the rotation section 20 (hereinafter referred to as "rotation moving force F2") acts on the coating substance R on the coating surface Tf, as shown in FIG. 5B. The rotation moving force F2 is a component force, in a tangential direction of the coating surface Tf, of a centrifugal force Fc2 caused by the rotation of the rotation section 20. Rotating the rotation section 20 as above can correct thickness variation of the coating substance R caused in the peripheral direction of the coating surface Tf and thereby achieves desired thickness uniformity of the coating substance R coated on the coating surface Tf Because the purpose of the rotation of the rotation section 20 is to correct the thickness variation, in the peripheral direction, of the coating substance R caused by the revolution of the revolution section 10, it just suffices if a position, in the peripheral direction, of the coating surface Tf can be moved as appropriate. It is therefore preferable that the rotation speed of the rotation section 20 be lower than the rotation speed at which movement of the coating substance R on the coating surface Tf occurs due to the rotation moving force F2 caused by the rotation about the rotation axis 23a. It is preferable that the rotation speed of the rotation section 20 be typically lower than the revolution speed of the revolution section 10 and lower than 200 rpm, and the rotation speed of the rotation section 20 may be changed halfway. Also note that, considering the purpose of correcting the thickness variation, in the peripheral direction, of the coating substance R caused by the revolution of the revolution section 10, the rotation of the rotation section 20 may be intermittent rather than continuous. In a case where the rotation section 20 is to be rotated about rotation axis 23a at a rate of one turn per five minutes, for example, the rotation section 20 may be rotated continuously at a speed of 0.2 rpm or may be rotated intermittently 90° per every 75 seconds at a speed higher than the 0.2 rpm rotation speed. In any case, it is preferable to determine a rotation speed of the rotation section 20 such that a ratio of a maximum value of the rotation moving force F2 to the revolution moving force F1 (the "maximum value of the rotation moving force F2"/ "revolution moving force F1") becomes 0.5 or less.

While the revolution of the revolution section 10 and the rotation of the rotation section 20 are being effected in the aforementioned manner, it is determined whether the processing time has elapsed or not (S9). The processing time is a predetermined time length that is necessary for forming the coating substance R on the coating surface Tf to a desired thickness and that is determined in advance taking into account the physical property of the coating surface Tf, the revolution speed of the revolution section 10, and the revolution distance L. If the processing time has not elapsed as determined in the step of determining whether the processing time has elapsed or not (S9), the process reverts back to the step of determining whether the processing time has elapsed or not (S9). If, on the other hand, the processing time has elapsed, the revolution of the revolution section 10 is stopped (S10), and then the rotation of the rotation section 20 is stopped (S11). In this manner, a film of the coating substance R having the desired thickness is formed on the coating surface Tf of the object T substantially uniformly as depicted by a solid line L1 in FIG. 4, which means that a coated object TR has been manufactured. In the flow chart shown in FIG. 3, the steps from the step of starting the rotation of the rotation section 20 (S7) to the step of stopping the rotation of the rotation section 20 (S11) correspond to a rotation step, and the steps from the step of starting the revolution of the revolution section 10 (S8) to the step of stopping the revolution of the revolution section 10 (S10) correspond to a revolution step.

Although, in the flow chart shown in FIG. 3, the sequence of operations carried out in the spreading apparatus 1 is executed typically by the control device 60, the sequence may be executed by an operator of the spreading apparatus 1 who performs operations (such as switch depressing operations) on the basis of operator's judgements. Further, although the step of starting the revolution of the revolution section 10 (S8) has been described as being performed after the step of starting the rotation of the rotation section 20 (S7), the step of starting the revolution of the revolution section 10 (S8) may be performed before the step of starting the rotation of the rotation section 20 (S7), or the two steps (S7) and (S8) may be performed simultaneously. Similarly, although the step of stopping the rotation of the rotation section 20 (S11) has been described as being performed after the step of stopping the revolution of the revolution section 10 (S10), the step of stopping the rotation of the rotation section 20 (S11) may be performed before the step of stopping the revolution of the revolution section 10 (S10), or the two steps (S10) and (S11) may be performed simultaneously. Alternatively, the revolution (revolution of the revolution section 10) and the rotation (rotation of the rotation section 20) may be performed alternately instead of, or in addition to, the revolution and the rotation being performed simultaneously in whole or in part.

With the method for manufacturing a coated object TR by the spreading apparatus 1 according to this embodiment, as set forth above, it is possible to make the thickness of the coating substance Tf substantially uniform in the radius direction of the coating surface Tf because the coating substance R on the coating surface Tf is spread by the revolution of the revolution section 10. Further, with the method according to this embodiment, it is possible to correct thickness variation of the coating substance R in the peripheral direction of the coating surface Tf because the rotation of the rotation section 20 is effected in addition to the revolution of the revolution section 10. Thus, with the method, a uniform film of the coating substance R can be formed on the entire coating surface Tf Further, with the method, it is possible to suppress generation of an excessive coating substance R (waste liquid) during spreading the coating substance R by the spreading apparatus 1. Because an excessive coating substance R is removed from the coating surface Tf by the coating substance R being spread preliminarily through rotation via the spin chuck before the object T dispensed with the coating substance R is set on the spreading apparatus 1.

Although it has been described above that the object T is a lens with its coating surface Tf formed as a spherical surface, the coating surface Tf may be other than a spherical surface, such as a near-spherical or substantially spherical surface including an elliptical, paraboloidal or hyperboloidal surface, or a curved surface having one or more undulating portions. Further, the bottom surface Tb may be of other than a circular shape, and the object T may be any other object than a lens. Let it be assumed that in the case where the coating surface Tf is a substantially spherical surface, the curvature radius is, in principle, a curvature radius on a regression surface derived by the least-square method. At this time, up to which degree of error the coating surface Tf should be approximated to a spherical surface may be determined as appropriate depending on the thickness uniformity, physical property, and the like of the coating substance R to be coated on the coating surface Tf. Also note that in a case where the shape of the near-spherical surface, such as an elliptical, paraboloidal or hyperboloidal surface, can be expressed by a relational expression of a conic coefficient descriptive of a non-spherical surface shape (namely, by the following expression containing a conic coefficient indicative of a non-spherical surface: $Z(s)=\{C \cdot s^2/(1+(1-(1+k) \cdot C^2 \cdot s^2)^{1/2})\}+A4 \cdot s^4+A6 \cdot s^6+A8 \cdot s^8+\ldots$, where C represents 1/curvature radius and k represents the conic coefficient), the curvature radius in the relational expression of the conic coefficient may be set at the curvature radius of the coating surface Tf Further, if the shape of the coating surface Tf cannot be expressed as-is or directly by a relational expression of a conic coefficient, but the shape of the coating surface Tf can be expressed by a relational expression of a conic coefficient by use of the least-square method, then the curvature radius in the relational expression of the conic coefficient expressed by use of the least-square method may be set at the curvature radius of the coating surface Tf Although it has been described above that the revolution bottom plate 11b is formed of a plate-shaped member, the revolution bottom plate 11b may be of a pyramidal, conical, or semi-spherical shape rather than a plate shape. Similarly, the revolution side plate 11s may each be of a shape other than a plate shape. Further, the plurality of the revolution side plates 11s may be interconnected or formed integrally into a polygonal shape, a cylindrical shape, or the like. Furthermore, although it has been described above that the surfaces of the revolution bottom plate 11b and the revolution side plate 11s are perpendicular to each other, the bottom plate 11b and the side plate 11s may be disposed in such a manner that their respective surfaces form any other desired angle. Furthermore, although it has been described above that two revolution side plates 11s are provided, the number of the revolution side plates 11s may be increased or decreases as appropriate depending on the shape and size of the revolution bottom plate 11b or a necessary number of the objects T coated with the coating substance R.

Furthermore, although it has been described above that the preliminary spread step (S3) is performed by the spin chuck, the preliminary spread step may be performed by the spreading apparatus 1 in place of the spin chuck, in which case the revolution side plate 11s of the revolution section 10 may be configured to be changeable in its angle relative to the revolution bottom plate 11b. In the case where the preliminary spread step is performed by the spreading apparatus 1, transfer of the object T from the spin chuck to the spreading apparatus 1 can be omitted, and as a result, the time necessary for manufacturing the coated object TR can be decreased. Furthermore, in a case where the coating substance R does not have to be spread on the coating surface Tf before the object T is set on the spreading apparatus 1, the preliminary spread step (S3) may be omitted. For example, in a case where the coating substance R is dispensed to the entire coating surface Tf by using a slit coater, a die coater, or the like in the dispensing step (S2), the preliminary spread step (S3) can be omitted.

Furthermore, it has been described above that a portion of the coating substance R removed from the coating surface Tf in the preliminary spread step (S3) is collected. However, if it is not necessary to collect the removed coating substance R, for example, for the reason that the removed coating substance R is not reused, or if there occurs no excess portion of the coating substance R coated on the coating surface Tf in the dispensing step (S2) and hence there is no coating substance R removed from the coating surface Tf, the collection step (S5) can be omitted.

Furthermore, although it has been described above that the coating substance R is dispensed onto the coating surface Tf after the object T is set on the spin chuck, the object T may be set on the spin chuck after the coating substance R is dispensed onto the coating surface Tf; in the case where the preliminary spread step (S3) is omitted, the coating substance R may be dispensed onto the coating surface Tf either before or after the object T is set on the spreading apparatus 1. Alternatively, the coating substance R may be dispensed onto the coating surface Tf after the object T set on the spin chuck starts to be rotated; in the case where the preliminary spread step (S3) is omitted, the coating substance R may be dispensed onto the coating surface Tf after the revolution of the revolution section 10 is started or after the rotation of the rotation section 20 is started.

Furthermore, although it has been described above that the revolution radius L is approximately 0.7 times the curvature radius Tfr of the coating surface Tf, the revolution radius L may be other than approximately 0.7 times the curvature radius Tfr; if the revolution radius L is larger enough than the curvature radius Tfr, the rotation of the rotation section 20 (rotation step S7) can be omitted. As an example, if the revolution radius L is approximately three times or more the curvature radius Tfr, the rotation of the rotation step (S7) can be omitted. Note that, from a viewpoint of preventing a size increase of the spreading apparatus 1, it is preferable that the revolution radius L be approximately five times or less the curvature radius Tfr.

Furthermore, although it has been described above that the revolution section 10 and the rotation section 20 are in such a positional relationship that the rotation axis 23a extends horizontally, and perpendicularly to the revolution axis 13a, an angle α formed between the revolution axis 13a and the rotation axis 23a can be set as appropriate depending on the shape of the coating surface Tf and the like. In the case where the coating surface Tf is a spherical surface, the above-mentioned angle α is preferably within a range of 15 to 135 degrees, more preferably within a range of 30 to 120 degrees, still more preferably within a range of 45 to 105 degrees, far more preferably within a range of 60 to 100 degrees, and especially preferably about 90 degrees(90±5 degrees). Furthermore, the angle α may be changed as appropriate during the revolution of the revolution section 10 and/or the rotation of the rotation section 20. Typically, an angle formed between the surface of the revolution bottom plate 11b and the surface of the revolution side plate 11s also changes as the angle α is changed. Further, the revolution section 10 and the rotation section 20 may be disposed in such a manner that the revolution axis 13a and the rotation axis 23a are placed in a skew-lines relationship, rather than in a perpendicular relationship; also, in this case, the relative positional relationship (such as an angle formed between the axes 13a and 23a when projected onto a flat surface) may be changed as appropriate like in the case where the axes 13a and 23a intersect each other.

Figure 6:
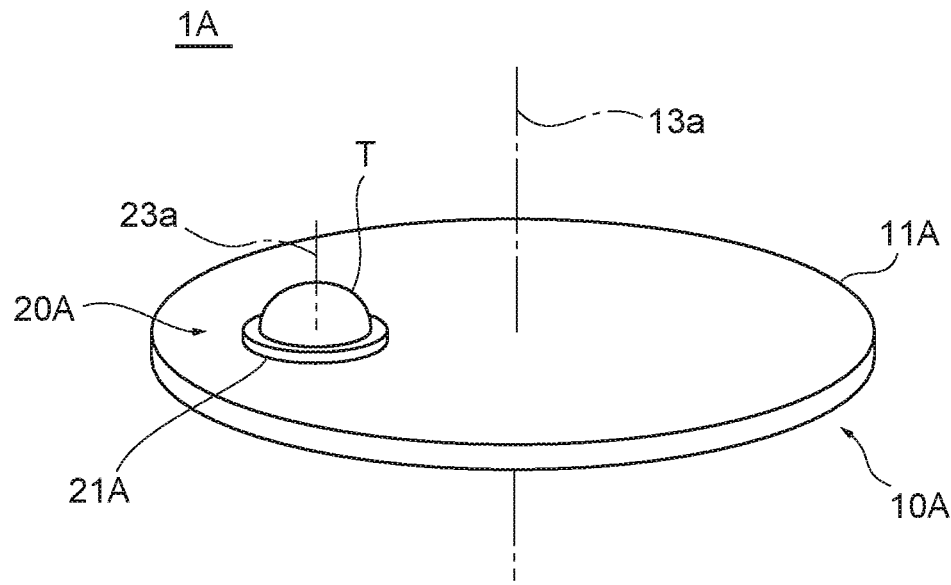
FIG. 6 is a perspective view showing a general configuration of a coating substance spreading apparatus according to a modification of the embodiment of the present invention, where a rotation axis extends parallel to a revolution axis.
Figure 7:
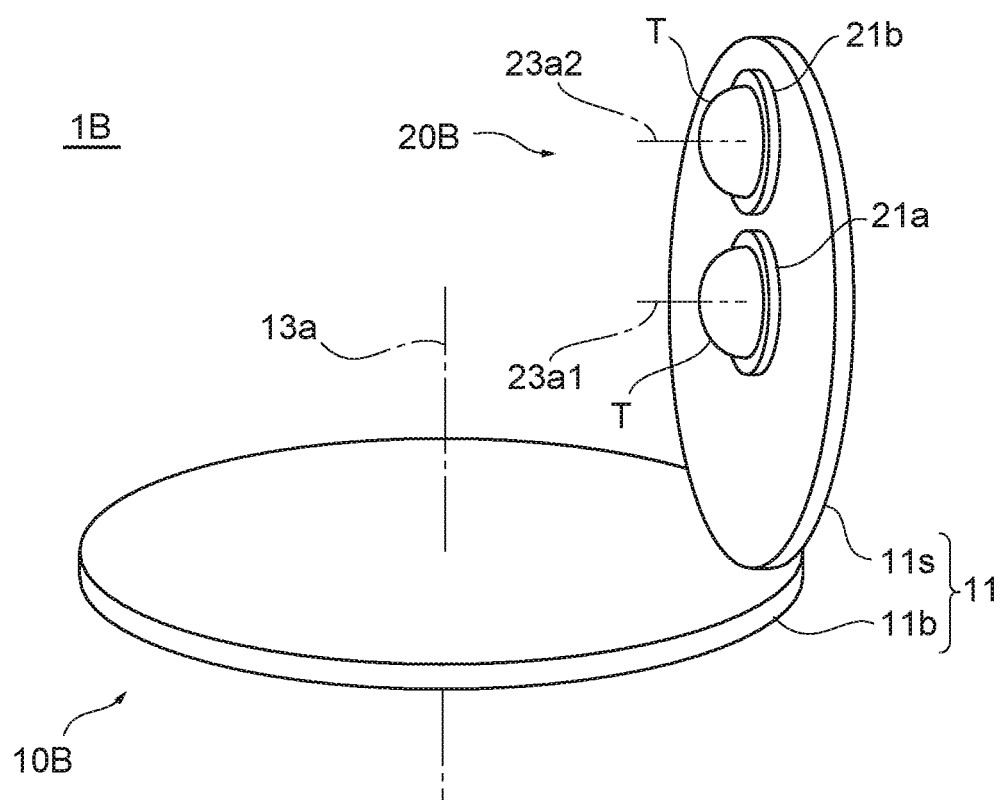
FIG. 7 is a perspective view showing a general configuration of a coating substance spreading apparatus according to another modification of the embodiment of the present invention, where a plurality of the rotation axes are provided.
Figure 8:
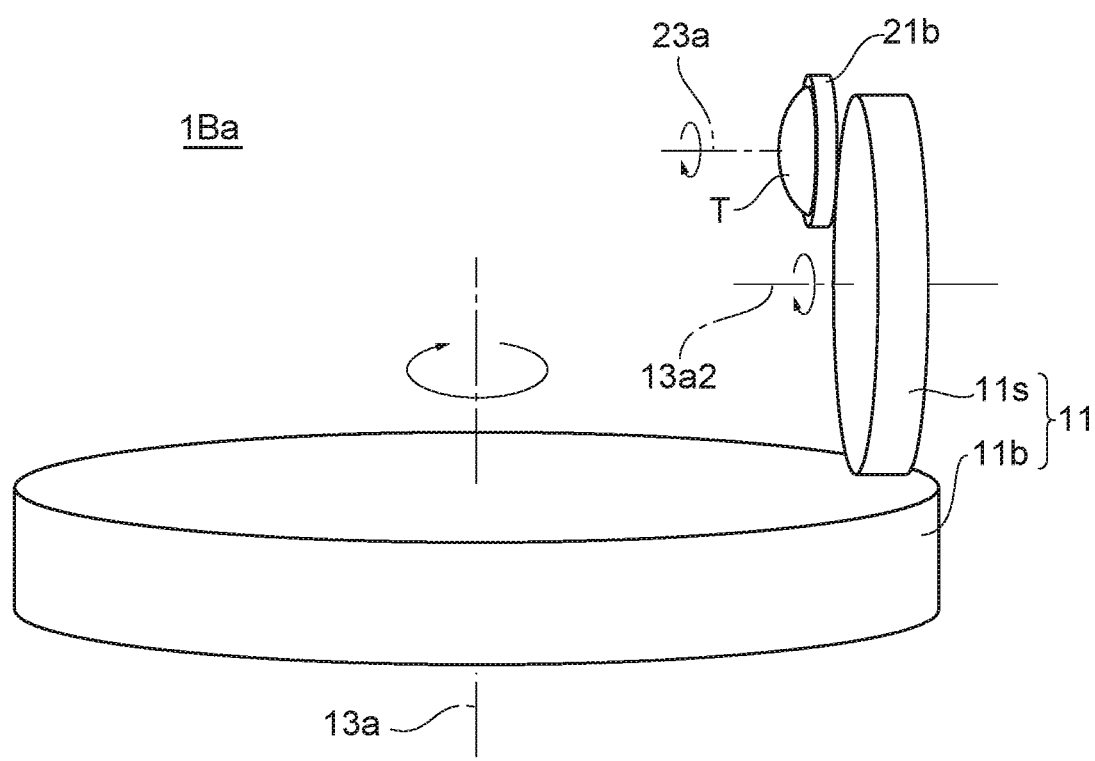
FIG. 8 is a perspective view showing a general configuration of a coating substance spreading apparatus according to still another modification of the embodiment of the present invention, where a revolution side plate is configured to be rotatable.

As another alternative, as illustrated in a spreading apparatus 1A of FIG. 6, a revolution section 10A including a revolution plate 11A and a rotation section 20A including a rotation plate 21A may be disposed in such a manner that the revolution axis 13a and the rotation axis 23a extend parallel to each other. As still another alternative, a rotation section 20B, as illustrated in a spreading apparatus 1B of FIG. 7, that includes two rotation plates 21a and 21b, namely a rotation plate 21a having a rotation axis 23a1 and a rotation plate 21b having a rotation axis 23a2, may be provided on the revolution side plate 11s. In such a case, angles of the individual rotation axes 23a1 and 23a2 relative to the revolution side plate 11s may be either identical to or different from each other, and it is preferable that the rotation speed and rotation timing be capable of being controlled separately for each of the rotation plates 21a and 21b. Note that three or more rotation plates may be provided following in the configuration of the rotation section 20B shown in FIG. 7. If a plurality of the rotation plates are provided, the number of processable objects T can be increased, and as a result, enhanced productivity is achievable. Furthermore, as illustrated in a spreading apparatus 1Ba of FIG. 8, another revolution mechanism may be incorporated in the revolution mechanism by modifying the spreading apparatus 1B of FIG. 7 so as to enable the revolution side plate 11s to revolve about a side-plate revolution axis 13a2 (the rotation plate 21a (see FIG. 7) is not shown in FIG. 8), with a view to dealing with an more complicated curved surface of the coating surface Tf.

Moreover, although it has been described above that the rotation section 20 is rotated by the rotation mechanism 25, the rotation section 20 may be rotated by a mechanism other than a motor, as will be described hereinbelow.

Figure 9A:
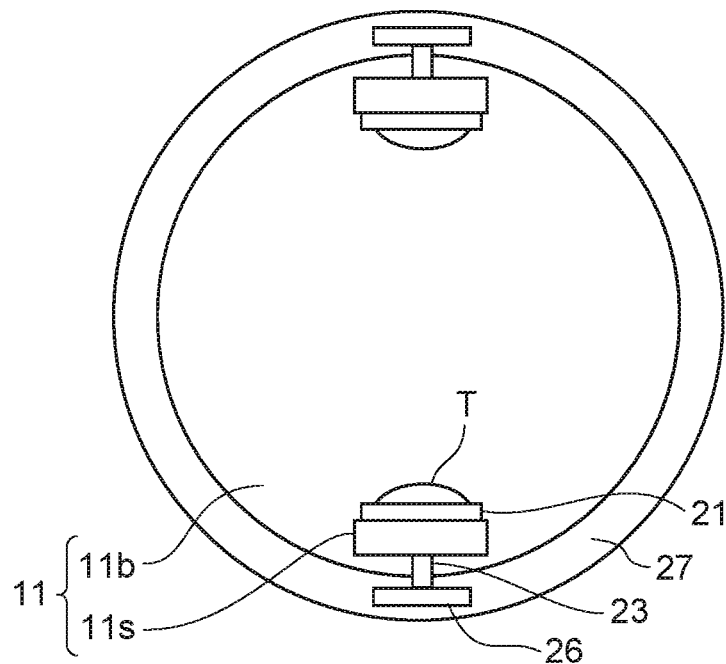
FIG. 9A is a schematic plan view showing a coating substance spreading apparatus according to a first modification of another embodiment of the present invention.
Figure 9B:
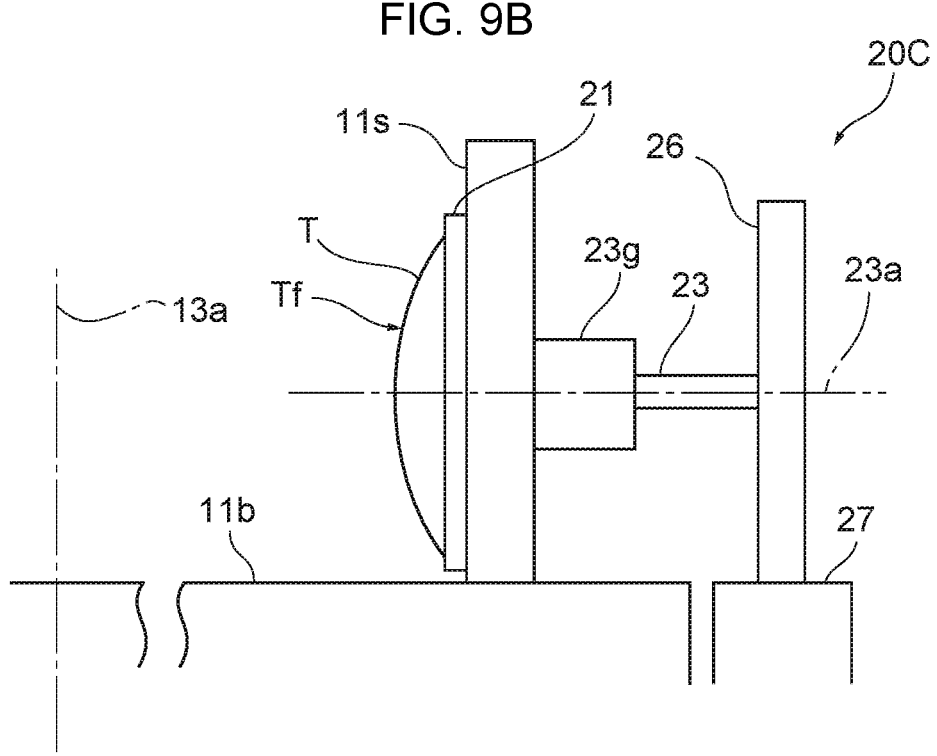
FIG. 9B is an enlarged fragmentary side view showing a rotation section and components around the rotation section of the coating substance spreading apparatus according to a first modification of another embodiment of the present invention.

FIGS. 9A and 9B show a spreading apparatus 1C according to a first modification of another embodiment of the present invention. FIG. 9A is a schematic plan view of the spreading apparatus 1C and FIG. 9B is an enlarged fragmentary side view showing a rotation section 20C and components around the rotation section 20C. In the spreading apparatus 1C, the revolution bottom plate 11b is formed in a circular plate shape. As in the spreading apparatus 1 (see FIG. 1), the revolution side plate 11s is fixed to the upper surface of the revolution bottom plate 11b. The rotation section 20C includes a tire 26 and a drum 27 in addition to the rotation plate 21 and the rotation shaft 23, but the rotation section 20C does not include the rotation mechanism 25 (see FIG. 1) as provided in the spreading apparatus 1 (see FIG. 1). The end of the rotation shaft 23 opposite to the end connected to the rotation plate 21 is connected to a hub of the tire 26. In this embodiment, the tire 26 is mounted to the rotation shaft 23 in such a manner that the surface of a wheel of the tire 26 lies parallel to the surface of the revolution side plate 11s and rotates in a tangential direction of the circumference of the revolution bottom plate 11b. The drum 27 is a component part which an outer peripheral surface of the tire 26 contacts, and the drum 27 is provided outside the outer periphery of the revolution bottom plate 11b in such a manner as to surround the outer periphery of the revolution bottom plate 11b. In contrast to the revolution bottom plate 11b that revolves about revolution axis 13a, the drum 27 is fixed so as not to make rotational and other movement. A gearbox 23g is provided on the rotation shaft 23, and gears are accommodated in the gearbox 23g such that a ratio between the rotation speed of the rotation plate 21 and a rotation speed of the tire 26 can be set as appropriate. The gearbox 23g corresponds to the rotation speed adjustment section. In the spreading apparatus 1C configured in the aforementioned manner, where the drum 27 does not rotate whereas the revolution plate 11 revolves about the revolution axis 13a, the tire 26 contacting the drum 27 rotates about the rotation axis 23a, and the rotation plate 21 rotates, in response to the rotation of the tire 26, at a predetermined gear ratio via the rotation shaft 23. Thus, in the spreading apparatus 1C, the revolution plate 11 and the rotation plate 21 can be caused to revolve/rotate simultaneously through the operation of the revolution mechanism. Note that the drum 27 may be rotated in the same direction as, or opposite direction to, the direction of the revolution bottom plate 11b, instead of being fixed, in such a manner that the rotation speed of the rotation plate 21 can be adjusted by a speed difference between the revolution of the revolution bottom plate 11b and the rotation of the drum 27; in this case, a mechanism that rotates the drum 27 corresponds to the rotation speed adjustment section.

Figure 10A:
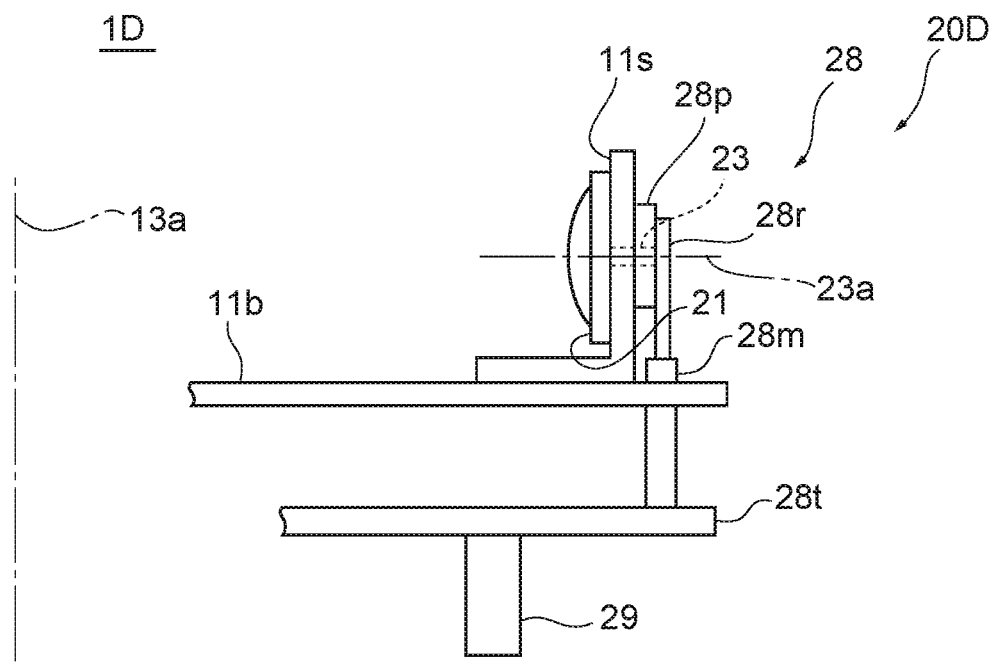
FIG. 10A is a fragmentary side view showing a coating substance spreading apparatus according to a second modification of another embodiment of the present invention, and FIG.
Figure 10B:
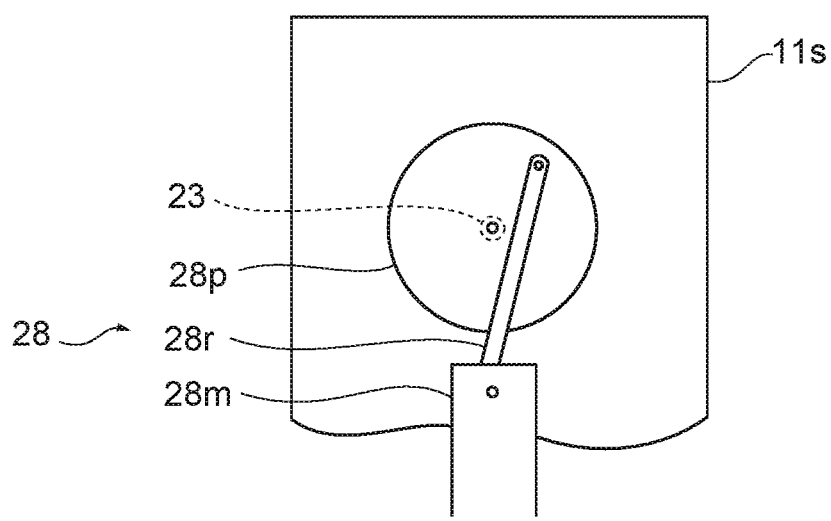

FIGS. 10A and 10B show a spreading apparatus 1D according to a second modification of another embodiment of the present invention. FIG. 10A is a fragmentary side view showing a rotation section 20D and components around the rotation section 20D. FIG. 10B is a fragmentary front view showing a crank section 28 and components around the crank section 28. In the spreading apparatus 1D, the rotation section 20D includes the crank section 28 and a drive motor 29 in addition to the rotation plate 21 and the rotation shaft 23, but the rotation section 20D does not include the rotation mechanism 25 (see FIG. 1) as provided in the spreading apparatus 1 (see FIG. 1). The crank section 28 includes a rotating plate 28p, a connecting rod 28r, an up-down moving section 28m, and a transmitting plate 28t. The rotating plate 28p is a circular plate-shaped member and positioned in such a manner that a surface of the rotating plate 28p extends along the outer surface of the revolution side plate 11s. The end of the rotation shaft 23 opposite to the end connected to the rotation plate 21 is connected to a rotation center of the rotating plate 28p. The connecting rod 28r is a member for interconnecting the rotating plate 28p and the up-down moving section 28m, and the connecting rod 28r has one end connected to a surface portion of the rotating plate 28p near a circular outer periphery remote from the rotation center of the rotating plate 28p and has the other end connected to one end of the up-down moving section 28m. The up-down moving section 28m is a rod-shaped member extending in the up-down direction through the revolution bottom plate 11b, and the up-down moving section 28m has the one end connected to the other end of the connecting rod 28r as noted above and has the other end slidably placed on the surface of the transmitting plate 28t. The transmitting plate 28t is a member that transmits power of the drive motor 29 to the up-down moving section 28m, and the transmitting plate 28t is formed in a circular plate shape. Typically, the transmitting plate 28t is formed in generally the same size as the revolution bottom plate 11b. If a plurality of the rotation sections 20D are provided, the transmitting plate 28t is formed in such a size as to cover the other ends of all of the up-down moving sections 28m. The transmitting plate 28t is provided opposite to the revolution side plate 11s across the revolution bottom plate 11b. The drive motor 29 is a drive source for moving the transmitting plate 28t vertically upward and downward; typically, a servomotor is used as the drive motor 29. In the spreading apparatus 1D configured in the aforementioned manner, the up-down moving sections 28m slides on and along the upper surface of the transmitting plate 28t as the revolution plate 11 revolves about the revolution axis 13a. At this time, as the drive motor 29 is actuated as appropriate to reciprocate the transmitting plate 28t up and down, the up-down moving sections 28m moves up and down, in response to the up and down movement of the transmitting plate 28t, to thereby rotate the rotating plate 28p about the rotation axis 23a via the connecting rod 28r, so that the rotation plate 21 rotates about the rotation axis 23a, and thus, the rotation of the rotation section 20D is effected. Because the actuation of the drive motor 29 and the revolution of the revolution plate 11 are effected independently of each other in the spreading apparatus 1D, the revolution speed of the revolution plate 11 and the rotation speed of the rotation section 20 can be set at respective desired values.

While the foregoing has described, by way of an example with reference to FIGS. 1 to 10B, the spreading apparatus and the method for manufacturing the coated object according to the embodiments of the present invention, the configurations, constructions, numbers, positions, shapes, materials, and the like of the various components are not limited to the specific examples described above, and other configurations, constructions, numbers, positions, shapes, materials, and the like selectively employed as appropriate by persons skilled in the art are also embraced within the scope of the present invention as long as they cover the gist of the present invention.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

DESCRIPTION OF REFERENCE NUMERALS AND SYMBOLS 1, 1A, 1B, 1Ba, 1C, 1D spreading apparatus
10, 10A, 10B revolution section
13a revolution axis
20, 20A, 20B, 20C, 20D rotation section
23a, 23a1, 23a2 rotation axis
60 control device
L revolution radius
R coating substance
T object
Tf coating surface

The invention claimed is:

1. A method for manufacturing a coated object, the coated object comprising an object coated with a coating substance on a coating target surface of the object, and the coating target surface having a curved surface, the method comprising:
dispensing the coating substance onto the coating target surface;
removing, from the coating target surface, a portion of the coating substance dispensed onto the coating target surface in the dispensing, the portion of the coating substance being an amount exceeding a predetermined amount;
after the removing, continuously revolving the object, having the coating substance dispensed onto the coating target surface, about a revolution axis located remotely from the object; and
while continuously revolving the object, rotating the object, having the coating substance dispensed onto the coating target surface, about a rotation axis passing through the object,
wherein an angle formed between the revolution axis and the rotation axis at a position at which the revolution axis and the rotation axis intersect each other is from 15 degrees to 165 degrees.

2. A method for manufacturing a coated object, the coated object comprising an object coated with a coating substance on a coating target surface of the object, and the coating target surface having a curved surface, the method comprising:
dispensing the coating substance onto the coating target surface, wherein the coating substance contacts part of the coating target surface;
rotating the object to increase a range over which the coating substance contacts the coating target surface, wherein the rotating comprises removing, from the coating target surface, a portion of the coating substance dispensed onto the coating target surface in the dispensing, the portion of the coating substance being an amount exceeding a predetermined amount;
after the rotating, revolving the object, having the coating substance dispensed onto the coating target surface, about a revolution axis located remotely from the object; and
while continuously revolving the object, further rotating the object, having the coating substance dispensed onto the coating target surface, about a rotation axis passing through the object,
wherein an angle formed between the revolution axis and the rotation axis at a position at which the revolution axis and the rotation axis intersect each other is from 15 degrees to 165 degrees.

3. The method for manufacturing a coated object according to claim 2, wherein a ratio of a force acting on the coating substance on the coating target surface to move the coating substance in the further rotating, to a maximum force acting on the coating substance on the coating target surface to move the coating substance in the revolving, is 0.5 or less.

4. The method for manufacturing a coated object according to claim 2, wherein a rotation speed in the further rotating is lower than a revolution speed in the revolving.

5. The method for manufacturing a coated object according to claim 1, further comprising, before the revolving, collecting the coating substance that has been removed from the object in the removing.

6. The method for manufacturing a coated object according to claim 1, wherein a ratio of a force acting on the coating substance on the coating target surface to move the coating substance in the rotating, to a maximum force acting on the coating substance on the coating target surface to move the coating substance in the revolving, is 0.5 or less.

7. The method for manufacturing a coated object according to claim 1, wherein a rotation speed in the rotating is lower than a revolution speed in the revolving.

* * * * *